(12) United States Patent
Minematsu (10) Patent No.: US 7,188,166 B2
(45) Date of Patent: Mar. 6, 2007

(54) STORAGE SYSTEM, STORAGE CONTROL DEVICE, AND CONTROL METHOD FOR STORAGE SYSTEM

(75) Inventor: Tetsuya Minematsu, Odawara (JP)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 10/785,972

(22) Filed: Feb. 26, 2004

(65) Prior Publication Data

US 2005/0125426 A1 Jun. 9, 2005

(30) Foreign Application Priority Data

Dec. 4, 2003 (JP) ............................. 2003-406160

(51) Int. Cl.
*G06F 15/173* (2006.01)
*G06F 15/16* (2006.01)
(52) U.S. Cl. ...................... 709/223; 709/224; 709/247
(58) Field of Classification Search ................ 709/203, 709/217–219, 223–226, 235, 245
See application file for complete search history.

(56) References Cited

U.S. PATENT DOCUMENTS

| | | | |
|---|---|---|---|
| 5,606,679 A | | 2/1997 | Cohn et al. |
| 5,720,028 A | | 2/1998 | Matsumoto et al. |
| 6,088,814 A | | 7/2000 | McKenzie et al. |
| 6,360,306 B1 | | 3/2002 | Bergsten |
| 6,526,478 B1 | * | 2/2003 | Kirby ......................... 711/114 |
| 6,535,518 B1 | * | 3/2003 | Hu et al. ..................... 370/401 |
| 6,542,964 B1 | * | 4/2003 | Scharber ...................... 711/122 |
| 6,581,104 B1 | * | 6/2003 | Bereiter ....................... 709/232 |
| 6,629,213 B1 | * | 9/2003 | Sharma ....................... 711/144 |
| 6,735,631 B1 | * | 5/2004 | Oehrke et al. ............... 709/226 |
| 2002/0103923 A1 | * | 8/2002 | Cherian et al. ............. 709/235 |
| 2002/0103969 A1 | | 8/2002 | Koizumi et al. |
| 2003/0093442 A1 | | 5/2003 | Mogi et al. |
| 2004/0083339 A1 | | 4/2004 | Yamamoto et al. |
| 2004/0111558 A1 | | 6/2004 | Kistler et al. |
| 2004/0122799 A1 | | 6/2004 | Goyal et al. |

FOREIGN PATENT DOCUMENTS

| | | |
|---|---|---|
| JP | 09-258907 | 10/1997 |
| JP | 2002-288105 | 10/2002 |

* cited by examiner

*Primary Examiner*—Ario Etienne
*Assistant Examiner*—Hussein Elchanti
(74) *Attorney, Agent, or Firm*—Mattingly, Stanger, Malur & Brundidge, P.C.

(57) ABSTRACT

Provided is storage system comprising a plurality of first information-processing devices; a storage control device which is communicatively connected with the first information-processing devices via a first communication network, to receive a data input/output request transmitted from an information-processing device, and to read or write data from or to a storage device according to the data input/output request; and a second information-processing device communicatively connected with the first information-processing devices and the storage control device, wherein each of the first information-processing devices transmits processing status data relating to data input/output requests being processed to the second information-processing device; the second information-processing device receives the processing status data and transmits the storage control device a message which relates to performance adjustment of the storage control device for the first information-processing devices, and is determined according to the processing status data; and the storage control device executes processing related to performance adjustment of the first information-processing devices according to the message.

19 Claims, 7 Drawing Sheets

DATA WRITE REQUEST

FIG.5

DATA READ REQUEST

| COMMAND | LUN | ADDRESS | WWN | DATA SIZE |
|---------|-----|---------|-----|-----------|
| 511 | 512 | 513 | 514 | 515 |

FIG.6

LU ADMINISTRATION TABLE
600

| COMMUNICATION PORT (WWNc) | LUN | LOGICAL DEVICE NUMBER | STORAGE CAPACITY (GB) |
|---|---|---|---|
| 611 | 612 | 613 | 614 |
| ⋮ | ⋮ | ⋮ | ⋮ |
| 100 | 0 | 1001 | 80 |
| | | 1002 | 80 |
| | | 1003 | 80 |
| | | 1004 | 80 |
| | | 1005 | 80 |
| | 1 | 1006 | 120 |
| | | 1007 | 120 |
| 200 | 0 | 1010 | 40 |
| | | 1011 | 40 |
| | | 1012 | 40 |
| | | 1013 | 40 |
| | | 1014 | 40 |
| ⋮ | ⋮ | ⋮ | ⋮ |

PROCESSING CONDITION DATA

| WWN | QUEUE LENGTH VALUE |
|---|---|
| 911 | 912 |

FIG.10

EXAMPLES OF ASSOCIATED CONFIGURATION INFORMATION

| HOST NAME | WWNj | DEVICE FILE | STORAGE NAME | WWNc | LOGICAL DEVICE NUMBER |
|---|---|---|---|---|---|
| 1011 | 1012 | 1013 | 1014 | 1015 | 1016 |
| A | 00:00:00:60:69:00:60 | C0T0d0 | Z | 00:00:00:60:01:00:50 | 01 |
| A | 00:00:00:60:70:00:60 | Disk3 | Z | 00:00:00:60:02:00:50 | 02 |
| A | 00:00:00:60:71:00:60 | C2t3d7 | Y | 00:00:00:60:03:00:50 | 03 |
| .. | .. | .. | .. | .. | .. |

TUNING INSTRUCTION MESSAGE

STORAGE SYSTEM, STORAGE CONTROL DEVICE, AND CONTROL METHOD FOR STORAGE SYSTEM

BACKGROUND OF THE INVENTION

1. Field of the Invention

The present invention relates to a storage system, storage control device, and control method for a storage system.

2. Description of the Related Art

In conjunction with developments in IT-related industries, storage control devices for disk array devices and the like are rapidly coming into broad use. Storage control devices have become established as the main infrastructure for performing data administration services, Web services, and various other information services provided in information service centers, data centers, and the like.

The amount of data handled by storage control devices is now increasing annually. Because of this, mechanisms for efficiently handling large amounts of data stored in memory resources and delivering a high-speed response to an information-processing device are being increasingly sought.

Among such mechanisms, mechanisms are disclosed in Japanese Patent Application Laid-open Nos. H9-258907 and 2002-288105, for example, for efficiently operating a storage control device. Both of these mechanisms are devised for performing performance adjustment (tuning) of a storage control device on the basis of the processing time required for processing a command received from a host computer, the amount of data transferred between servers, and other information acquired in the storage control device.

However, when control relating to the aforementioned performance improvement is performed in such a storage system solely on the basis of information acquired in the storage control device as described above, without taking the situation of the information-processing device into account, performance adjustment of the storage control device may not necessarily be performed optimally. For example, the processing load of the storage control device can sometimes be predicted based on the situation of the information-processing device, but because such information is not communicated to the storage control device, performance adjustment of the storage control device is sometimes not performed optimally.

SUMMARY OF THE INVENTION

The present invention was developed in view of the foregoing drawbacks, and an object thereof is to provide a storage system, a storage control device, and a control method for a storage system that are capable of optimally adjusting the performance of a storage control device while reflecting the situation of the information-processing device.

The main aspect of the present invention for achieving the aforementioned objects consists of a storage system that comprises a plurality of first information-processing devices; a storage control device communicatively connected with the first information-processing devices by a first communication network, to receive data input/output requests transmitted from the information-processing devices and to read or write data from or to the storage device according to the input/output request thus received; and a second information-processing device communicatively connected with the first information-processing devices and storage control device, wherein each of the first information-processing devices has a processing status data transmitter for transmitting to the second information-processing device transmitting processing status data consisting of data that indicate the status of processing related to the aforementioned data input/output requests being processed; the second information-processing device has a message transmitter for receiving the aforementioned processing status data and transmitting to the aforementioned storage control device a message that relates to performance adjustment of the aforementioned storage device for the first information-processing devices and is determined according to the processing status data thus received; and the storage control device has an adjustment executer for receiving the aforementioned message and executing processing related to performance adjustment of the first information-processing devices according to the message thus received.

By means of the present invention, the performance of a storage control device can be optimally adjusted while reflecting the situation of an information-processing device.

DESCRIPTION OF THE PREFERRED EMBODIMENTS

An embodiment of the present invention will be described hereinafter with reference to the figures.

Configuration of Storage System

Figure 1:
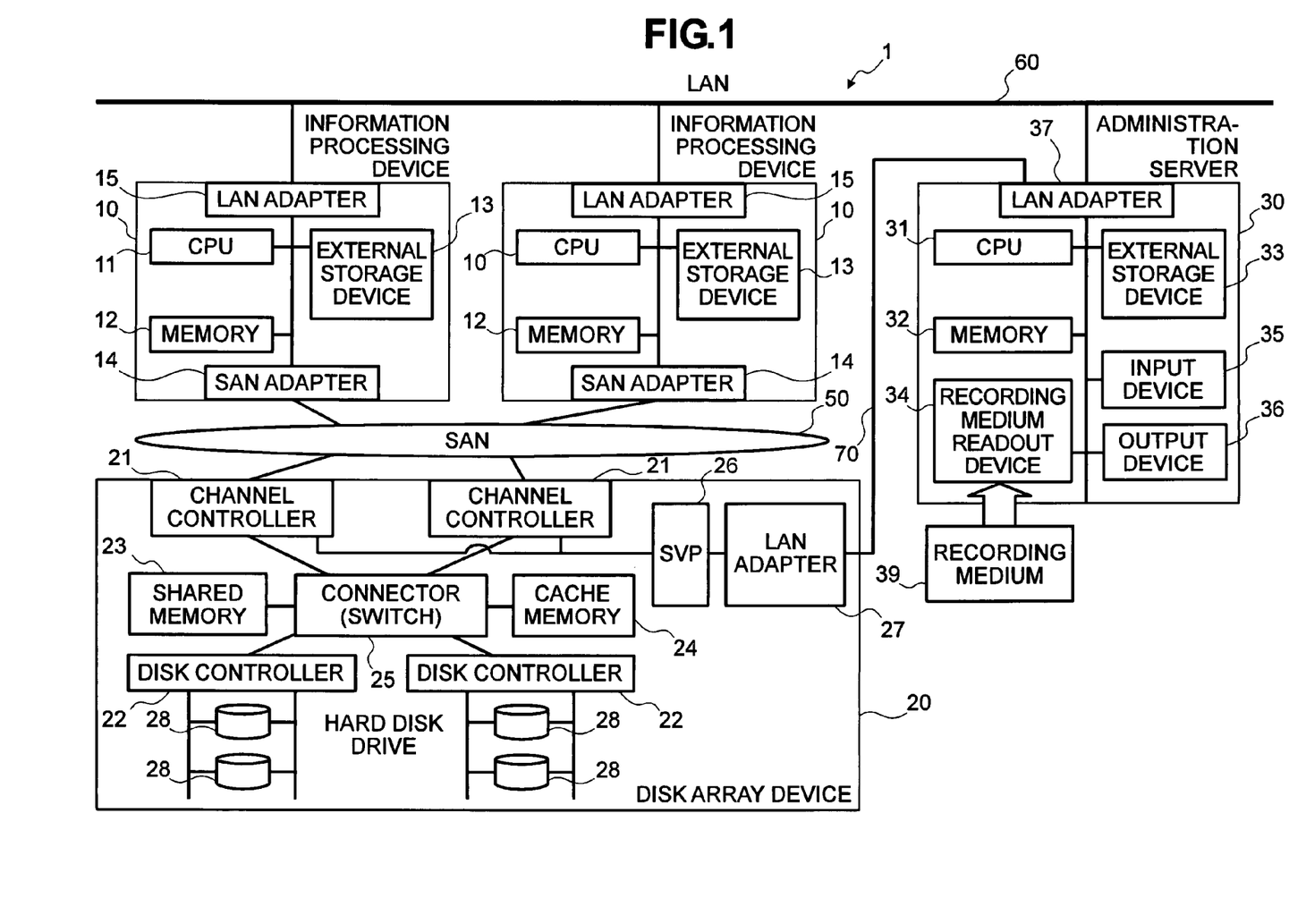
FIG. 1 is a diagram depicting the basic structure of the storage system 1 described as an embodiment of the present invention.

FIG. 1 shows the configuration of the storage system described as an embodiment of the present invention. The storage system 1 is made up of a plurality of information-processing devices (first information-processing devices) 10 and a disk array device (storage control device) 20 connected so as to be capable of communication with the information-processing devices 10 by a SAN (Storage Area Network) (first communication network) 50 that is configured using a fiber channel protocol.

The storage system 1 is operated by a system center in a data center or company, for example. The information-processing devices 10 consist of computers for providing an automatic cash dispensing service at a bank or an Internet homepage browsing service, for example. The disk array device 20 functions as a depository for data used by application software and other programs executed in the information-processing devices 10, for example. The disk array device 20 receives a data read request, data write request, or other request transmitted via SAN 50 from the information-processing devices 10 and reads or writes data in the hard disk drives (storage devices) 28 in response to the received data input/output request.

The information-processing devices 10 are connected by means of a LAN (Local Area Network) (second communication network) 60. The TCP/IP protocol, for example, is employed as the transmission protocol of the LAN 60. An administration server (second information-processing device) 30 is connected to the LAN 60. The information-processing devices 10 are connected by the LAN 60 so as to be capable of communication with the administration server 30. The administration server 30 is connected with the disk array device 20 via a LAN 70. The TCP/IP protocol, for example, is employed as the transmission protocol of the LAN 70. Also, the LAN 60 may be connected with the LAN 70.

The disk array device 20 may be designed so as to function as a NAS (Network Attached Storage) that is configured to receive data input/output requests according to file name assignments from the information-processing devices 10 by means of a NFS (Network File System) or other protocol, for example. The disk array device 20 may also consist of other storage control devices, such as semiconductor disk devices or the like.

Communication between the information-processing devices 10 and the disk array device 20 may also be performed by means of a LAN (Local Area Network), SCSI (Small Computer System Interface), iSCSI (Internet Small Computer System Interface), ESCON (Enterprise System Connection) (registered trademark), FICON (Fiber connection) (registered trademark), ACONARC (Advanced Connection Architecture) (registered trademark), or FIBARC (Fiber connection Architecture) (registered trademark) in addition to SAN 50. A peer-to-peer-type connection between the administration server 30 and disk array device 20 may be established using a SCSI specification communication line, for example.

<Information-Processing Devices 10>

The information-processing devices 10 consist, for example, of personal computers, workstations, mainframe computers, or other computers. The information-processing devices 10 are provided with a CPU (Central Processing Unit) 11, memory (ROM, RAM) 12, hard disk drive or other external storage device 13, SAN adapter 14, LAN adapter 15, and the like. Various functions of the information-processing devices 10 are performed by means of various programs being executed by CPU 11. SAN adapter 14 consists of a communication interface for connecting the information-processing devices 10 to SAN 50. An HBA (Host Bus Adapter), for example, is used as the SAN adapter 14. The LAN adapter 15 consists of an interface for connecting the information-processing devices 10 to the LAN 60. A NIC (Network Interface Card), for example, is used as the LAN adapter 15.

The information-processing devices 10 transmit a data input/output request in block units to the disk array device 20 according to the fiber channel protocol. The disk array device 20 performs processing related to reading/writing of data to a hard disk drive 28 when a data input/output request transmitted from the information-processing devices 10 is received. Also, when the information-processing devices 10 consist of NAS, a file name is set in the data input/output request.

<Disk Array Device 20>

The disk array device 20 is provided with a channel controller 21, disk controller 22, shared memory 23, cache memory 24, connector 25, service processor (SVP) 26, LAN adapter 27, hard disk drive (storage device) 28, and the like. The hard disk drive 28 may be built into the chassis of the disk array device 20, or may be housed in a separate chassis.

Figure 2:
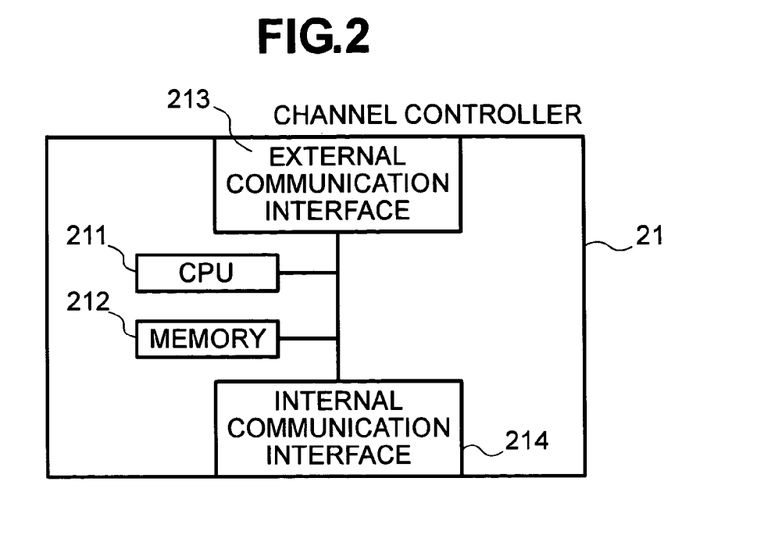
FIG. 2 is a diagram depicting the hardware configuration of the channel controller 21 described as an embodiment of the present invention.

The hardware configuration of the channel controller 21 is shown in FIG. 2. The channel controller 21 is provided with a CPU 211, memory (RAM, ROM) 212, external communication interface 213, internal communication interface 214, and the like. The CPU 211 administers control of the channel controller 21 as a whole. The CPU 211 (*1) performs various functions of the channel controller 21 by executing programs stored in the memory 212. The external communication interface 213 is an interface for communicating with the information-processing devices 10 via SAN 50. The internal communication interface 214 gives and receives data and commands between the disk controller 22, shared memory 23, cache memory 24, and the like via the connector 25. The internal communication interface 214 communicates with the service processor 26. When a data input/output request is received from the information-processing devices 10, the channel controller 21 writes a command to the shared memory 23 relating to reading/writing of corresponding data.

Figure 3:
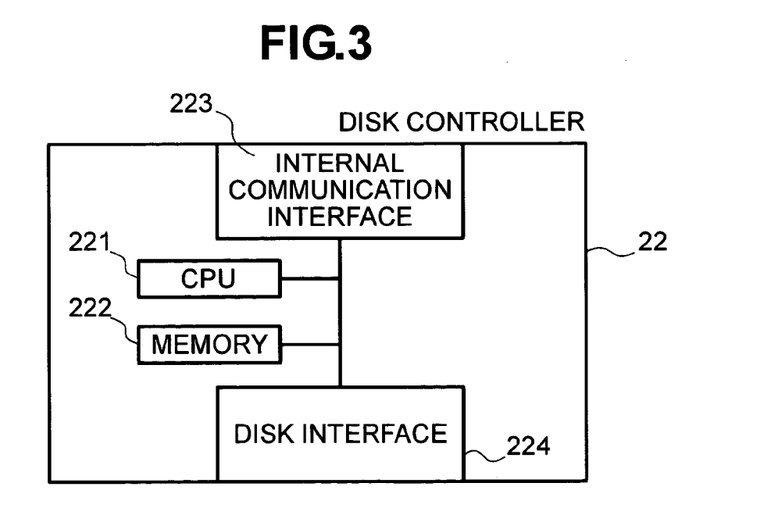
FIG. 3 is a diagram depicting the hardware configuration of the disk controller 22 described as an embodiment of the present invention.

The hardware configuration of the disk controller 22 is shown in FIG. 3. The disk controller 22 performs reading/writing of data to the hard disk drive 28 in accordance with a data write request that the channel controller 21 receives from the information-processing devices 10. The disk controller 22 is provided with a CPU 221, memory 222, internal communication interface 223, disk interface 224, and the like. The CPU 221 administers control of the disk controller 22 as a whole. The CPU 221 (*2) performs various functions of the disk controller 22 by executing programs stored in the memory 222. The internal communication interface 223 gives and receives data and commands between the channel controller 21, shared memory 23, cache memory 24, and the like via the connector 25. The disk interface 224 reads and writes data from and to the hard disk drive 28. The disk interface 224 gives and receives data from the hard disk drive 28. Also, the disk controller 22 may be provided with functionality for controlling the hard disk drive 28 at a RAID level (0, 1, or 5, for example) specified by a so-called RAID (Redundant Array of Inexpensive Disks) system.

The disk controller 22 reads a command from the shared memory 23 relating to reading/writing of data written in the shared memory 23 by the channel controller 21, and performs reading/writing of data to the hard disk drive 28 in accordance with the command. The disk controller 22 writes the data read from the hard disk drive 28 to the cache memory 24. The disk controller 22 transmits an appropriate notification of data write completion, notification of data read completion, or the like to the channel controller 21.

When the notification of completion is received, the channel controller 21 presents the information-processing devices 10 with a reply to the data input/output request.

The shared memory 23 and cache memory 24 are configured using RAM or other rewritable memory. Among such memory, the shared memory 23 mainly stores commands and data given and received between the channel controller 21 and disk controller 22. The shared memory 23 (*2a) absorbs the time for accessing the hard disk drive 28 and enhances response to the information-processing devices 10. Using the cache memory 24 makes it possible to enhance processing efficiency relating to reading/writing of data performed between the channel controller 21 and disk controller 22; for example, the response speed (response) to the information-processing devices 10 can be enhanced.

The connector 25 connects together the channel controller 21, disk controller 22, shared memory 23, and cache memory 24 to allow them to communicate with each other. The connector 25 is configured using an ultra high-speed crossover switch or other high-speed bus for transferring data by high-speed switching, for example.

The service processor (SVP) 26 is configured with a CPU and memory. The service processor 26, as such, can be made to function as an independent computer. The service processor 26 receives operational input by an operator or the like and performs monitoring, setting, and the like of the operational status of the disk array device 20. The service processor 26 communicates with the channel controller 21. The service processor 26 communicates with the administration server 30 via the LAN adapter 27 shown in FIG. 1.

The administration server 30 is a computer provided with a CPU 31; memory (RAM, ROM) 32; hard disk drive or other external storage device 33; CD-ROM device, DVD-ROM device, or other recording medium-reading device 34; mouse, keyboard, or other input device 35; display or other output device 36; LAN adapter 37; and the like. The CPU 31 administers overall control of the administration server 30. The various functions of the administration server 30 are performed by means of the CPU 31 executing the programs stored in the memory 32.

The recording medium-reading device 34 is a device for reading programs and data recorded in the recording medium 39. A configuration may be adopted whereby the recording medium-reading device 34 reads the data and programs recorded in the recording medium 39 and stores these in the memory 32 and external storage device 33. A configuration may be adopted whereby the recording medium 39 in which programs for executing various functions of the administration server 30 are recorded is set up in the recording medium-reading device 34, and the programs are installed in the administration server 30. A flexible disk, CD-ROM, DVD-ROM, DVD-RAM, semiconductor memory, or the like may be used as the recording medium 39. The administration server 30 is connected so as to be capable of communication with the disk array device 20 via the LAN adapter 37, and the administration server 30 can communicate with the information-processing devices 10 and service processor 26 of the disk array device 20. Also, the functions of the administration server 30 described in the present embodiment may be performed by the service processor 26 of the disk array device 20.

A WWN (World Wide Name) consisting of identifying information for identifying the instrument connected to the SAN 50 is created for the SAN adapter 14 of the information-processing devices 10. The WWN is created for each of the communication ports to the SAN 50 possessed by the SAN adapter 14. Consequently, two WWN are created for a SAN adapter 14 having two communication ports, for example. On the other hand, a WWN consisting of a network address on the SAN 50 is also created for the communication port of the channel controller 21 for providing connectivity to the SAN 50 in the disk array device 20. In the following description, the WWN created for the SAN adapter 14 of the information-processing devices 10 is abbreviated WWNj, and the WWN created for the communication port of the channel controller 21 is abbreviated WWNc.

The information-processing devices 10 recognize the storage area provided by the disk array device 20 as being made up of logical units (LU) that form a logical storage area. For example, when the operating system installed in the information-processing devices 10 is a UNIX (registered trademark) type operating system, the logical units are associated with a device file. As another example, when the operating system installed in the information-processing devices 10 is a Windows (registered trademark) type operating system, the logical units are associated with a drive letter (drive name). A specific logical unit number (LUN) is created for each logical unit in a set of logical units. The information-processing devices 10 specify a logical unit according to the LUN. The LUN is set by a-data input/output request transmitted from the information-processing devices 10 to the disk array device 20, for example.

Figure 4:
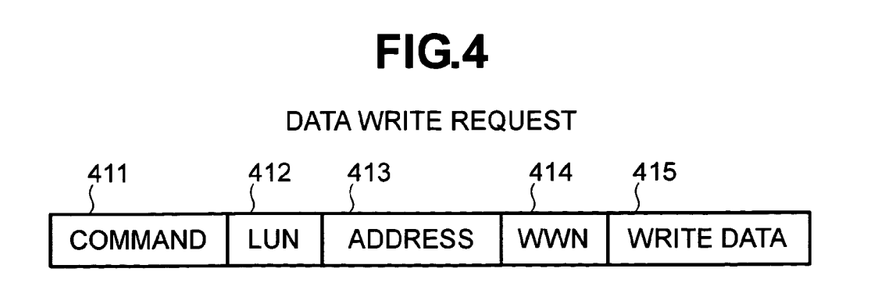
FIG. 4 is a diagram depicting an example of the data format of the data write request described as an embodiment of the present invention.

FIG. 4 depicts an example of the data format of a data write request consisting of a data input/output request transmitted from the information-processing devices 10 when data are written to the hard disk drive 28 of the disk array device 20. In the command column 411 of this data format, a command is set that indicates that the data input/output request is a data write request for the disk array device 20. In the LUN column 412, the LUN of the logical unit that will be written to is set. In the address column 413, the address of the logical unit that will be written to is set. In the WWN column 414, the WWNj created for the SAN adapter 14 from which the request was transmitted is set. In the write data column 415, the write data that will be written to the hard disk drive 28 is set.

Figure 5:
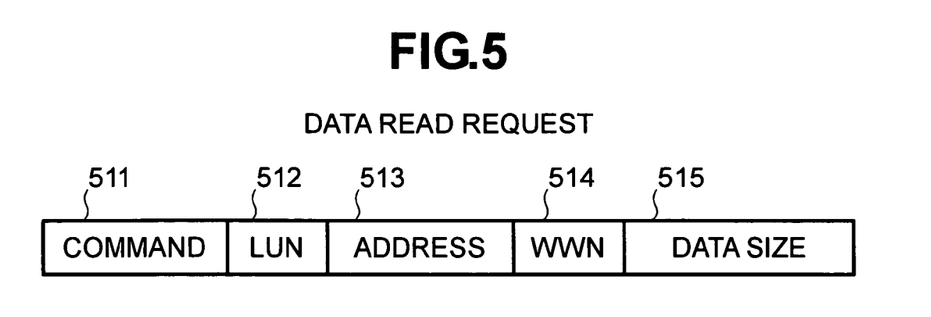
FIG. 5 is a diagram depicting an example of the data format of the data read request described as an embodiment of the present invention.

FIG. 5 depicts an example of the data format of a data read request consisting of a data input/output request transmitted from the information-processing devices 10 when data are to be read from the hard disk drive 28 of the disk array device 20. In the command column 511, a command is set that indicates that the data input/output request is a data read request from the disk array device 20. In the LUN column 512, the LUN of the logical unit that will be read from is set. In the address column 513, the beginning address of the logical unit that will be read from is set. In the WWN column 514, the WWNj created for the SAN adapter 14 from which the request was transmitted is set. In the data size column 515, the data size of the data that will be read from is set.

The disk array device 20 recognizes the physical storage area (hereinafter referred to as a physical storage area) of the hard disk drive 28 as being made up of logical devices (LDEV) as a storage area that is logically set using this storage area. A specific logical device number is created as an identifier for each logical device in the logical devices. The disk array device 20 of the present embodiment administers a parity group in the RAID5 system as one logical device.

Figure 6:
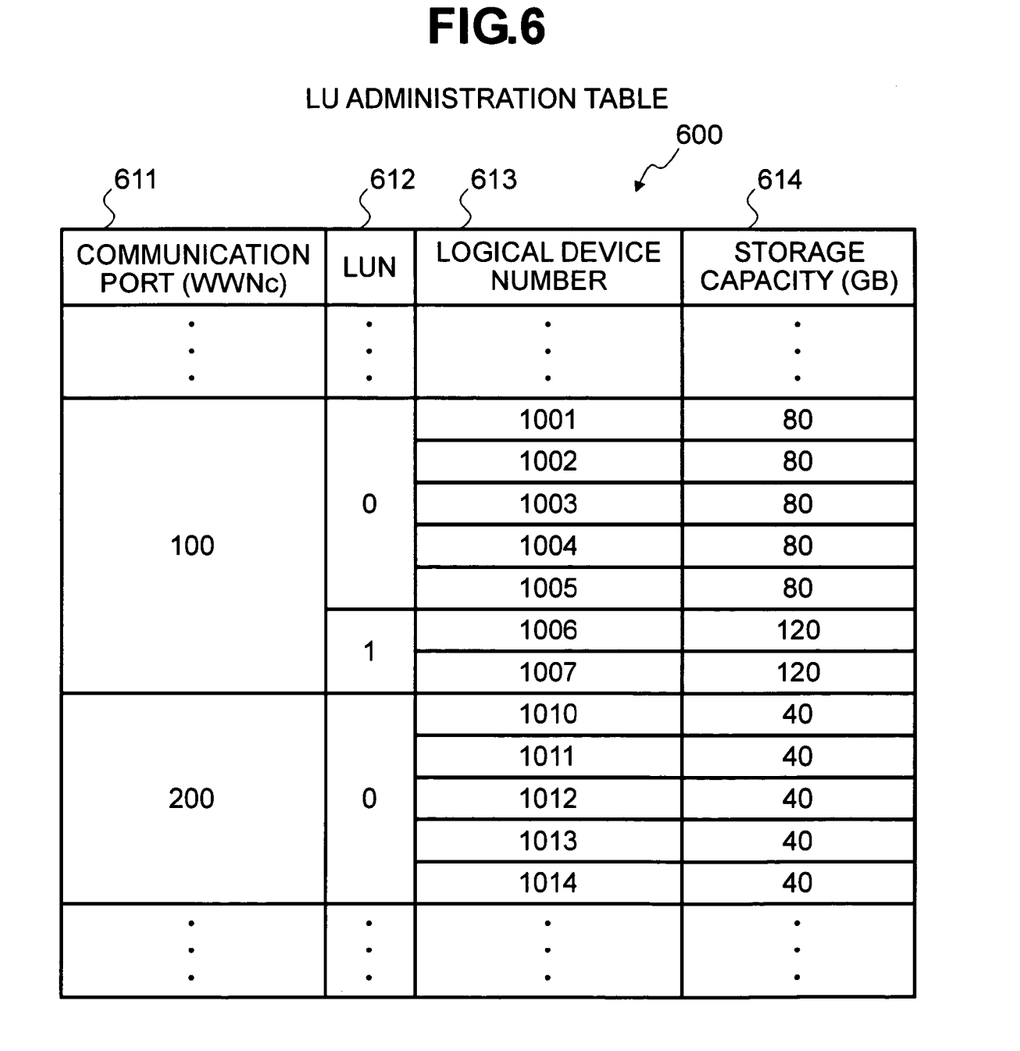
FIG. 6 is a diagram depicting an example of the LU administration table 600 described as an embodiment of the present invention.
Figure 7:
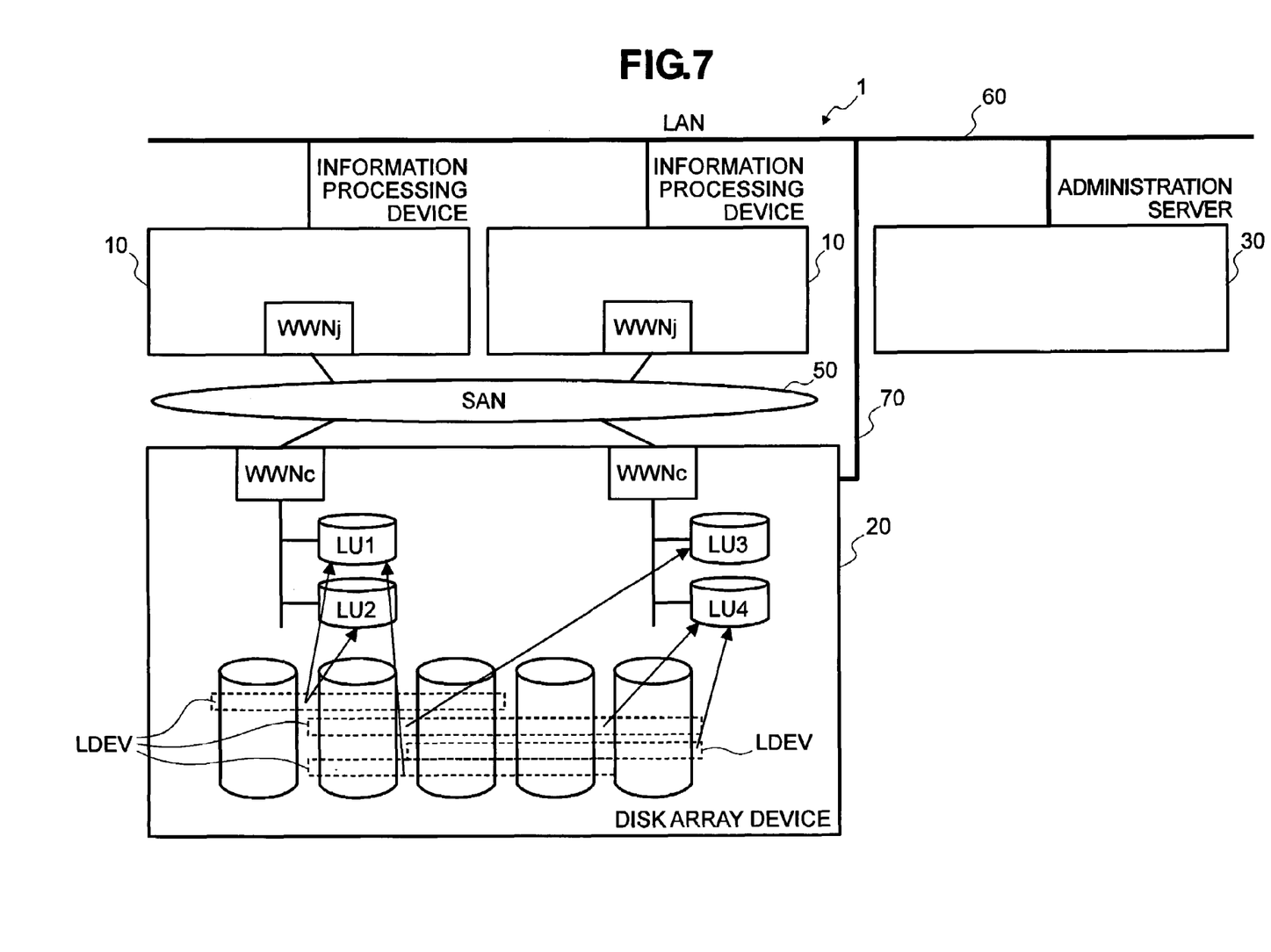
FIG. 7 is a diagram depicting the relationship between the WWNj, WWNc, LU, and LDEV in the storage system 1 described as an embodiment of the present invention.

The disk array device 20 administers correlation of the aforementioned logical units, which are the administrative units of the storage area in the information-processing devices 10, with a logical device. This administration is performed by the functioning of a logical unit manager 823, which will be described hereinafter. Regarding this administration, FIG. 6 depicts the LU administration table (hereinafter referred to as LU administration table) 600 that is stored and administered by the logical unit manager 823. A logical unit is correlated with a communication port of the channel controller 21 in the disk array device 20, and the correlation between the logical unit and the communication port is also administered by the LU administration table 600. The logical unit manager 823 stores the LU administration table 600 in the channel controller 21 or service processor 26, for example. In FIG. 6, a WWNc created for the communication port of the channel controller 21 is set in the communication port ID column 610. In the LUN column 611, a LUN is set, which is the number of the logical unit. In the logical device number column 612, a logical device number is set. In the storage capacity column 613, the storage capacity of the logical device is set. The relationship between the WWNj, WWNc, LU, and LDEV described above is shown schematically in FIG. 7.

Description of Functioning

The various functions performed in the storage system 1 of the present embodiment will next be described together with FIG. 8.

<Functioning of the Information-Processing Devices 10>

An operating system 811 operates in the information-processing devices 10. A UNIX (registered trademark), Windows (registered trademark), or other operating system, for example, may be employed as the operating system 811. A Web server or database, software for administrating a logical unit or logical device, software for setting and controlling a RAID system, or other application software 812 operates in the operating system 811. Software for operating a file system or NFS (Network File System), software for receiving access in accordance with a CIFS (Common Interface File System), and the like are in operation when the disk array device 20 consists of NAS.

In the operating system 811, an agent (processing status data transmitter) 813, consisting of one of the aforementioned types of application software 812, is in operation. The agent 813 provides functionality for transmitting processing status data that indicate the status of processing that relates to the data input/output requests transmitted from the information-processing devices 10 to the disk array device 20, and also for transmitting the hereinafter-described configuration information data and the like to the administration server 30 via the LAN 60. Also, the operating system 811, application software 812, and agent 813 are operated by means of the programs stored in the memory 12 and external storage device 13 being read and executed by CPU 11 in each of the information-processing devices 10.

A specific example of the aforementioned processing status data is a queue length value, which is an average time for the number of data input/output requests registered-in-the transmission processing waiting queue 814 of a communication port in the SAN adapter 14 of the information-processing devices. 10. The queue length value is found by dividing the total number of data input/output requests registered in the transmission processing waiting queue 814 within a certain past period of time in the communication port by the length of the aforementioned period of time. The agent 813 acquires the queue length values of the communication port of the SAN adapter 14. The agent 813 transmits the acquired queue length values of the SAN adapter 14 to the administration server 30 via the LAN 60.

The agent 813 can acquire the aforementioned queue length values in real time using an operating system, API (Application Program Interface), or the like. For example, if the operating system consists is a UNIX (registered trademark) system, the agent 813 can acquire the queue length values by delivering a "sar" command or "kstat" command.

Figure 9:
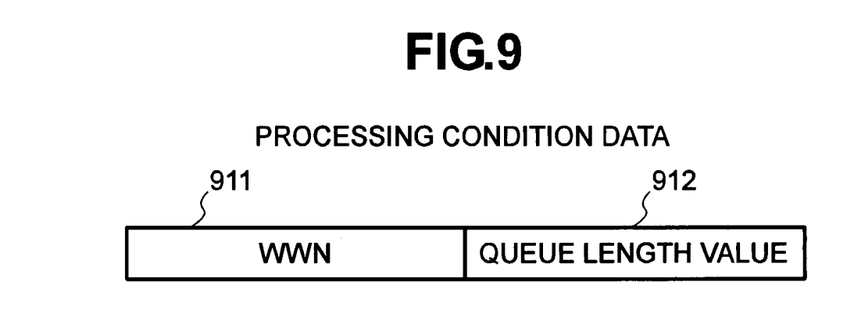
FIG. 9 is a diagram depicting the data format of the processing status data described as an embodiment of the present invention.

FIG. 9 depicts an example of the data format of the processing status data. In FIG. 9, the WWNj of the communication port is set in the WWN column 911. In the queue length value column 912, a queue length value is set that corresponds to the aforementioned WWNj. Also, the queue length value is only an example of the processing status data, but if it consists of information that is effective for predicting the processing load of the disk array device 20 (*3), it may be employed as the processing status data.

Also, the agent 813 acquires a host name or IP address created as an identifier on the LAN 60 for the information-processing devices 10; the type and version of the operating system operating in the information-processing devices 10; the WWNj created for the SAN adapter 14 of the information-processing devices 10; the port number, logical device number, or other information about the channel controller 21 of the disk array device 20 set so as to be accessed by the information-processing devices 10; and other information relating to the configuration of the information-processing devices 10 (hereinafter referred to as configuration information), for example. Configuration information data, which consist of the data that set the aforementioned acquired configuration information, is then generated, and the configuration information data thus generated are transmitted to the administration server 30 (configuration information transmitter).

The agent 813 acquires the aforementioned configuration information using a command, API (Application Program Interface), or the like provided by the operating system 811. When communication between the information-processing devices 10 and the disk array device 20 is performed according to an SCSI (Small Computer System Interface) specification, the agent 813 may sometimes acquire the WWNj created for the SAN adapter 14, or a port number as an identifier of a communication port of the channel controller 21 of the disk array device 20 accessed by the information-processing devices 10, by transmitting an "inquiry" command in the SCSI specification.

The agent 813 provides the configuration information data with a communication port or logical device number associated with an identifier for a storage area (a device file, drive letter, or the like, for example) recognized by the operating system 811 of the information-processing devices 10, and transmits these data to the administration server 30.

Figure 10:
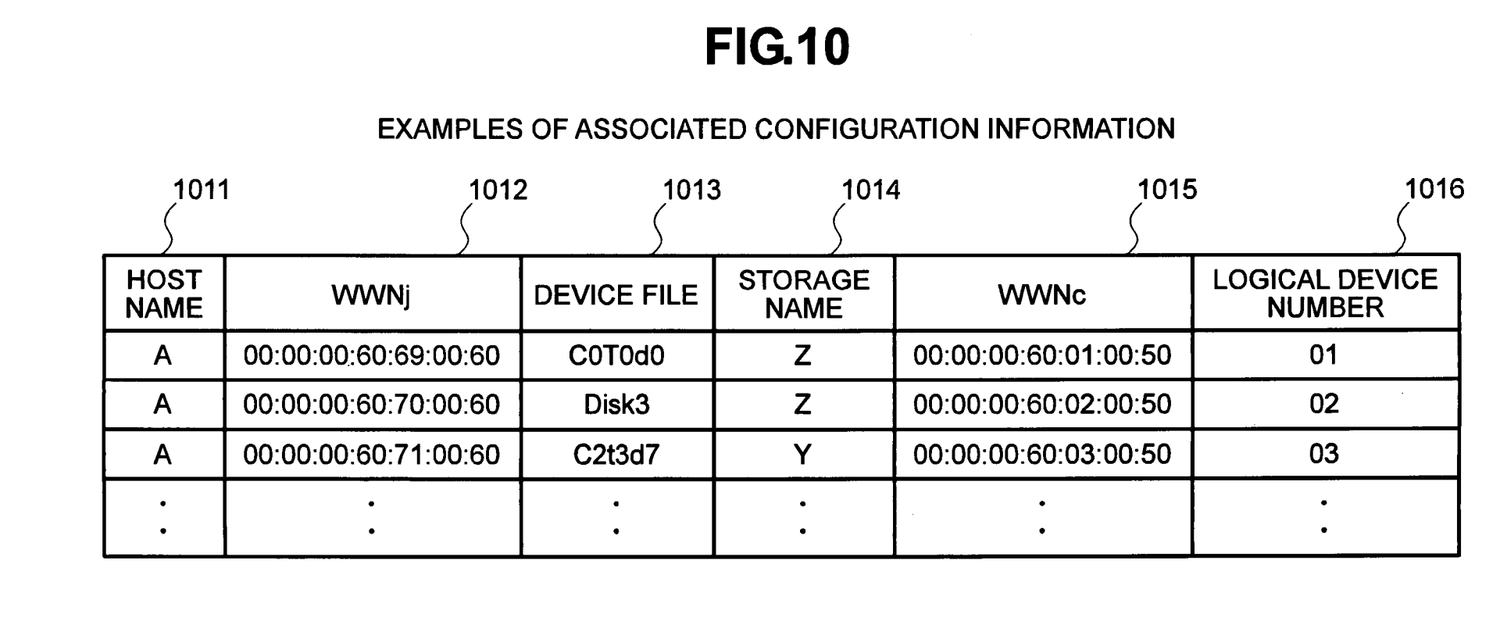
FIG. 10 is a diagram depicting the relationship between items of configuration information described as an embodiment of the present invention.

The configuration information is transmitted by the agent 813 periodically, arbitrarily, or with an appropriate timing at a time scheduled by a scheduler or the like. The agent transmitter 832 of the administration server 30 receives configuration information data transmitted by the administration server 30 and registers a description thereof in the database (configuration information storing unit) 834. FIG. 10 shows the data format of the configuration information registered in the database 834. The configuration information is associated as a WWNj or other prescribed item, for example, and is registered in the database 834.

In FIG. 10, the host name of the information-processing device 10 is set in the host name column 1011. The WWNj created for the SAN adapter 14 of the information-processing devices 10 is set in the WWNj column 1012. A so-called device file name in UNIX (registered trademark) is set in the device file column 1013 when UNIX (registered trademark) is used as the operating system. An identifier for the disk array device 20 is set in the storage name column 1014. The WWNc created for the channel adapter 21 is set in the WWNc column 1015. The logical device number is set in the logical device number column 1016.

<Functioning of Administration Server 30>

An operating system 831 operates in the administration server 30. The operating system 831 is a UNIX (registered trademark), Windows (registered trademark), or other operating system. An agent transmitter 832, a disk array transmitter 833, a database 834, a control information-setting unit 835, and the like operate in the operating system 831. Also, the agent transmitter 832, disk array transmitter 833, and database 834 each function by means of CPU 31 of the administration server 30 reading and executing the programs stored in the memory 32 or external storage device 33.

The agent transmitter 832 communicates with the agent 813 operating in the information-processing devices 10 via the LAN 60. The agent transmitter 832 receives processing status data or configuration information data transmitted from the agent 813 either autonomously or in response to a transmission request from the agent transmitter 832, and registers this data in the database 834.

The disk array transmitter 833 (message transmitter) communicates with the administration server transmitter 821 of the disk array device 20 via the LAN 60.

The control information-setting unit 835 provides a user interface for performing setting relating to the operation of the tuning unit 822 of the disk array device 20. A user operates a keyboard, mouse, or other input device 35 while referring to information that the control information-setting unit 835 displays on a display or other output device 36, for example, and performs setting relating to the operation of the tuning unit 822. The control information-setting unit 835 presents the tuning unit 822 with control information that corresponds to the set content.

<Functioning of Disk Array Device 20>

A transmitter 821 to the administration server, a tuning unit 822, and a logical unit manager 823 operate in the disk array device 20. Also, these functions are performed by means of programs executed in the hardware of the service processor 26 or in the service processor 26.

The transmitter 821 to the administration server communicates with the administration server 30 via the LAN 70. The transmitter 821 to the administration server receives control information transmitted by the control information-setting unit 835 of the administration server 30 for performing operational setting of the tuning unit 822, and notifies the tuning unit 822 of the setting information thus received.

The tuning unit (adjustment executing unit) 822 performs various functions relating to adjustment (tuning) of the access performance of the information-processing devices 10 with respect to the hard disk drive (storage device) 28 in order to elicit maximum performance of the disk array device 20. A logical device configuration controller 8221 and priority controller 8222 are included in the tuning unit 822. When, for example, a logical unit is configured with a logical device that has a high utilization rate, the logical device configuration controller 8221 of the tuning unit 822 functions to allocate a logical device with a low utilization rate to that logical unit. The utilization rate in this case is a value in which the number of processes per unit time for a data input/output request, or the amount of data processed in relation to a data input/output request, for example, is calculated as a parameter. The logical device configuration controller 8221 can also be provided as a software function for distributing loads concentrated in specific resources of the disk array device 20 in order to equalize load among the resources of the disk array device 20.

A utilization rate measuring unit 82210, a manual controller 82211, and an automatic controller 82212 are contained in the logical device configuration controller 8221. The utilization rate measuring unit 82210 measures the utilization rate of each logical device in real time and stores the measured utilization rates in time series.

The manual controller 82211 provides functionality whereby a user determines which logical device is allocated to which logical unit. This setting is performed, for example, using the functioning of the control information-setting unit 835 of the administration server 30. The manual controller 82211 presents the logical device utilization rate stored by the utilization rate measuring unit 82210 to the user. The manual controller 82211 also presents the read speed of the logical devices to the user. The user refers to the utilization rate and read speed of the logical devices thus presented and determines which logical device is to be substituted. The logical device to be newly allocated to the logical unit is selected in place of the logical device targeted for substitution. During this selection, the user selects a logical device with a lower utilization rate or higher read/write speed than the logical device targeted for substitution as the logical device to be newly allocated to the logical unit. When the user selects a logical device to allocate to the logical unit, the manual controller 82211 duplicates the data stored in the logical device targeted for substitution onto the logical device thus selected. After this duplication, the manual controller 82211 then indicates to the logical unit manager 823 that the contents of the LU administration table 600 will be updated to show that the aforementioned logical device selected by the user was allocated to the aforementioned logical unit. The logical unit manager 823 updates the LU administration table 600 to reflect the aforementioned description. A logical unit consisting of a logical device with a high utilization rate is reconfigured with a logical device that has a low utilization rate or a logical device that has a high read speed as described above, and, as a result, reduction of the processing speed of logical devices with a high utilization rate is minimized.

On the other hand, the automatic controller 82212, in contrast with the manual controller 82211, automatically selects a logical device to be substituted and a logical device to be newly allocated to the logical unit on the basis of the utilization rate stored by the utilization rate measuring unit 82210. For this selection, the automatic controller 82212 stores a maximum value for the utilization rate set for each logical device. This setting is performed, for example, using the functions of the control information-setting unit 835 of the administration server 30. When the utilization rate of a logical device is detected to have exceeded the maximum value, the automatic controller 82212 assigns that logical device to be substituted and selects a logical device to be newly allocated to the logical unit in place of that logical device. In this selection, the automatic controller 82212 selects a logical device with a lower utilization rate or higher read/write speed than the logical device targeted for substitution as the logical device to be newly allocated to the logical unit. The automatic controller 82212 then duplicates the data stored in the logical device targeted for substitution onto the logical device thus selected. After this duplication, the automatic controller 82212 indicates to the logical unit manager 823 that the contents of the LU administration table 600 will be updated to show that the aforementioned logical device selected by the user was allocated to the aforementioned logical unit. The logical unit manager 823 updates the LU administration table 600 to reflect the aforementioned description. A logical unit consisting of a logical device with a high utilization rate is reconfigured with a logical device that has a low utilization rate or a logical device that has a high read speed as described above, and, as a result, reduction of the processing speed of logical devices with a high utilization rate is minimized.

The priority controller 8222 provides functionality for controlling the disk array device 20 so as to give priority to executing processing that relates to a data input/output request transmitted from an information-processing device 10 in which high processing power is required. An information-processing device 10 in which high processing power is required may, for example, be an information-processing device 10 in which an institutional database or application program is operating. If the processing power of such an information-processing device 10 were to decline, the service of the related institution could be significantly reduced. The priority controller 8222 functions so that any processing related to input/output requests transmitted from information-processing devices 10 in which high processing power is required is performed with a higher priority than other data input/output requests. Also, a user or the like determines whether or not to give priority to an input/output request transmitted from any of the information-processing devices 10, for example, by using the functions of the control information-setting unit 835 of the administration server 30. The control information-setting unit 835 presents the tuning unit 922 with a WWNj created for an information-processing device 10 that is set such that priority is given to the control of its data input/output requests. The tuning unit 922 stores the WWNj (hereinafter referred to as priority WWNj) thus transmitted.

The priority controller 8222 sets a maximum value for the number of processes per unit time for data input/output requests transmitted from information-processing devices 10 that are not set to receive priority control, and for the amount of data processed per unit time in relation to data input/output requests, and control is performed so that processing related to data input/output requests transmitted from information-processing devices 10 that are not set to receive priority control is performed below the aforementioned maximum value. The tuning unit 922 determines whether or not the received data input/output request is set to receive priority control by ascertaining whether or not the WWN (the WWN set in WWN column 414 or WWN column 514) set for that input/output request agrees with the stored priority WWNj. Specifically, when the WWN that is set for the data input/output request does not agree with the aforementioned priority WWNj, the tuning unit 922 performs control so that processing related to that data input/output request is performed below the aforementioned maximum value, and when the WWN that is set for the data input/output request agrees with the aforementioned priority WWNj, control according to the aforementioned maximum value is not performed for processing related to that data input/output request. By means of such an arrangement, the resources of the disk array device 20 are preferentially freed for data input/output requests transmitted from information-processing devices 10 with a high level of priority, with the result that processing related to data input/output requests from information-processing devices 10 with a high degree of priority is handled preferentially.

Also, in the aforementioned method whereby control is performed by setting a maximum value, during periods of time in which there are few data input/output requests transmitted from information-processing devices 10 with high priority, for example, allocation of more than the necessary amount of resources to information-processing devices 10 with low priority can be limited. However, this inconvenience can be avoided by making it so that processing that cancels maximum value control is automatically executed when the number of data input/output requests from information-processing devices 10 with high priority decreases, for example. More specifically, a threshold value is set for the number of data input/output requests transmitted from information-processing devices 10 with high priority, for example, and when the number of data input/output requests transmitted from information-processing devices 10 with high priority falls below the threshold value, restriction of the aforementioned maximum value is automatically cancelled, and when the threshold value is exceeded, control by the maximum value is resumed.

Also, the aforementioned maximum value, threshold value, and other settings relating to the processing of the priority controller 8222 may be established, for example, by a user or the like using the functions of the control information-setting unit 835 of the administration server 30.

Figure 8:
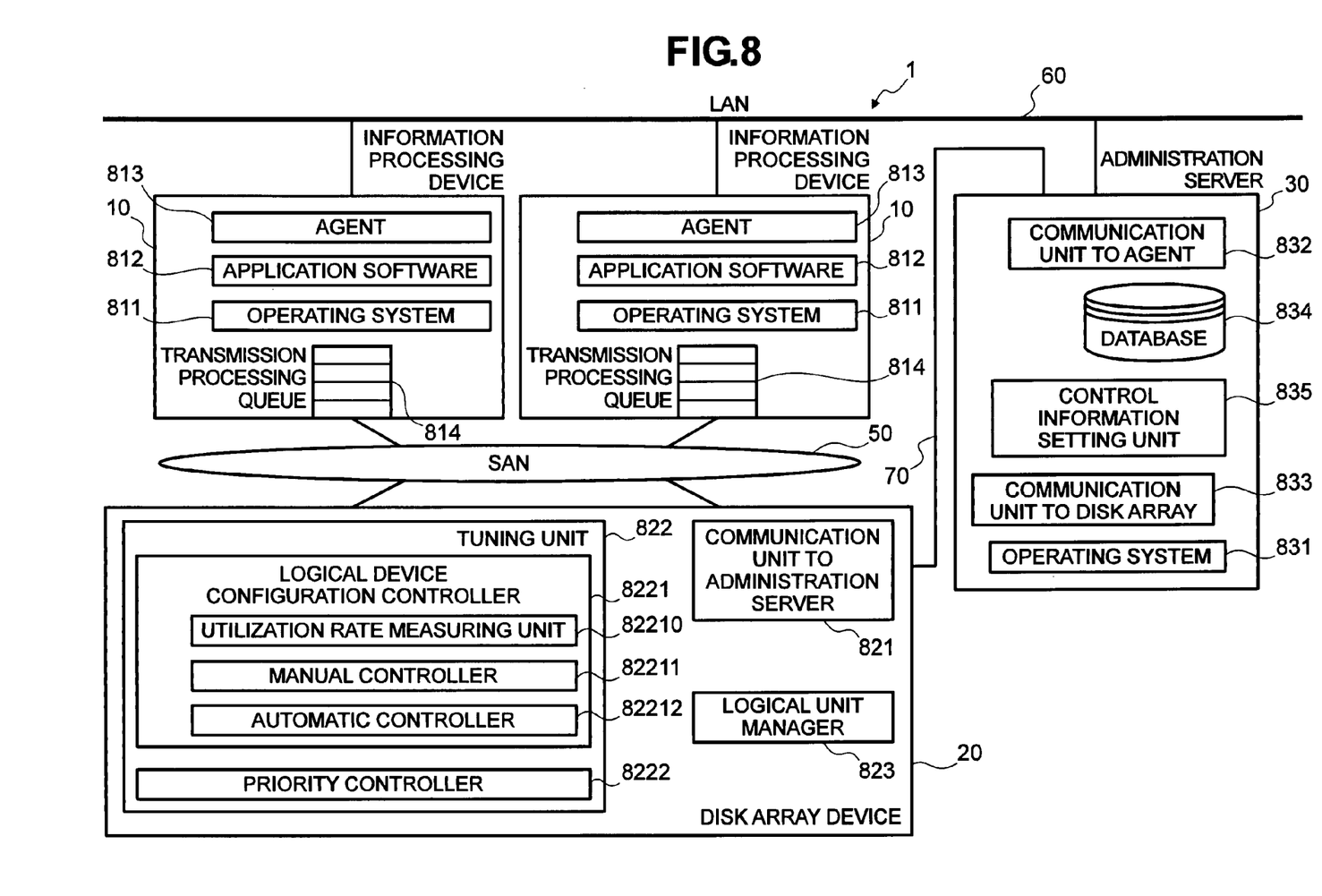
FIG. 8 is a diagram depicting the software configuration of the storage system 1 described as an embodiment of the present invention.

The logical unit manager 823 shown in FIG. 8 manages the LU administration table 600. The logical unit manager 823 receives instructions from the tuning unit 822 or the like and updates the contents of the LU administration table 600.

Description of Processing

The storage system 1 in the present embodiment monitors the load state of the communication ports of the SAN adapter 14 of the information-processing devices 10, and tunes the operation of the disk array device 20 according to the load state of the communication ports. This processing will be described hereinafter with reference to the flowchart shown in FIG. 11.

Figure 11:
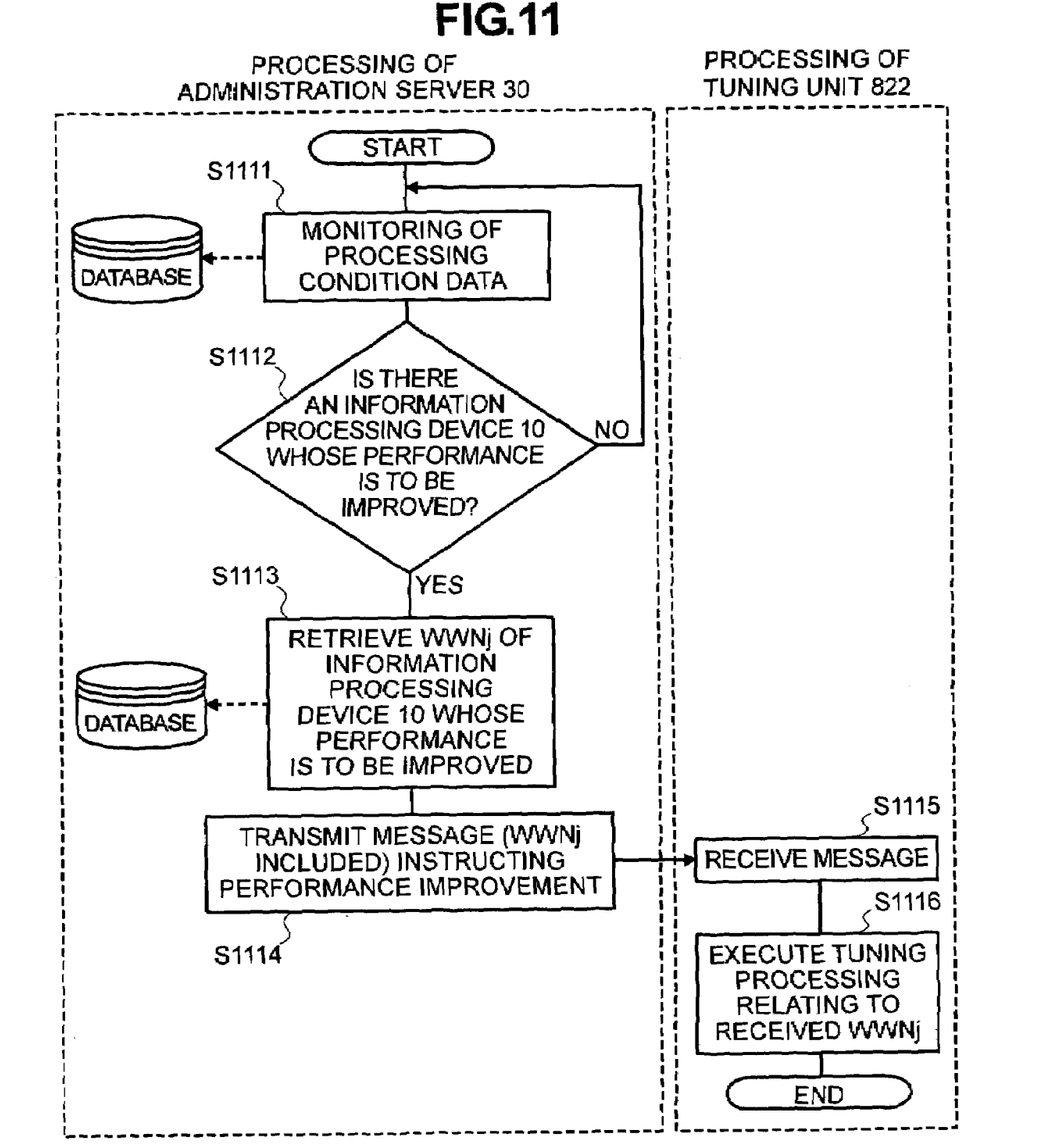
FIG. 11 is a flowchart describing the mechanism for tuning the operation of the disk array device 20 according to the load state of the communication ports in an embodiment of the present invention.

The administration server 30 monitors the processing status data of the communication ports of the information-processing devices 10 registered in the database 834 in real time (S1111), and determines whether or not a communication port exists that will be targeted for performance improvement (S1112). The aforementioned processing status data in this case consist of the queue length value described previously. Also, the aforementioned monitoring in this case is performed by associating the queue length values of the communication ports in the SAN adapter 14 of the information-processing devices 10 with the communication ports, and comparing the result with a threshold value registered in advance in the database 834.

In the presence of an information-processing device 10 whose performance is to be improved in this case (S1112: YES), the administration server 30 retrieves from the database 834 the WWNj created for the SAN adapter 14 of the information-processing device 10 targeted for performance improvement (S1113), and the system proceeds to processing step (S1114). Alternatively, when there is no information-processing device 10 whose performance is to be improved (S1112: NO), the system returns to processing step (S911).

Figure 12:
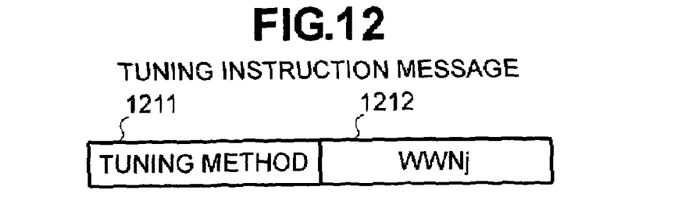
FIG. 12 is a diagram depicting the data format of the tuning instruction message described as an embodiment of the present invention.

In processing step (S1114), the administration server 30 transmits a message (hereinafter referred to as tuning instruction message) indicating performance improvement of the information-processing devices 10 to the tuning unit 822. The data format of the tuning instruction message is depicted in FIG. 12.

In this figure, information for describing the tuning method is set in the tuning method column 1211. For example, information is set in the tuning method column 1211 that describes whether tuning will be performed by the functioning of the logical device configuration controller 8221 or the priority controller 8222. The WWNj created for the SAN adapter 14 of the information-processing device 10 to be tuned is set in the WWNj column 7223.

When the aforementioned tuning instruction message is received, the tuning unit (adjustment executer) 822 executes tuning according to the contents of the message. When it is indicated in the tuning method column 1211 of the aforementioned tuning instruction message that tuning will be performed by the functioning of the logical device configuration controller 8221, the logical device configuration controller 8221 changes the association in the LU administration table 600 so that the performance of the logical unit associated with the WWNj set in the WWNj column 1212 of the tuning instruction message is enhanced in the LU administration table 600 by means of the mechanism described above. For example, the performance of the logical unit can be enhanced by allocating a WWNj registered in the LU administration table 600 or allocating a logical device with a low utilization rate to the logical unit.

On the other hand, when it is indicated in the tuning method column 1011 of the tuning instruction message that tuning will be performed by the functioning of the priority controller 8222, the priority controller 8222 performs control so that processing related to data input/output requests attached to the WWNj that is set in the WWNj column 1212 of the tuning instruction message is processed with priority by means of the mechanism described above.

As described above, in the storage system 1 of the present invention, processing status data are transmitted from the information-processing devices 10 to the administration server 30. The administration server 30 monitors the processing status data and transmits a message relating to performance adjustment (tuning) to the disk array device 20. The tuning unit 822 of the disk array device 20 executes processing for performance adjustment of the information-processing devices 10 according to the contents of the message. Thus, with the storage system 1 of the present embodiment, processing for performance adjustment in the disk array device 20 is performed appropriately according to the processing status of the information-processing devices 10. In other words, with the storage system of the present embodiment, performance adjustment of the disk array device 20 can be performed appropriately while reflecting the situation of the information-processing devices 10.

Tuning by Means of Configuration Information

The storage system 1 allows an operator or the like to input configuration information for the information-processing devices 10, and provides functionality for adjusting the performance of the disk array device 20 based on the configuration information thus inputted.

The aforementioned configuration information is inputted, for example, with the aid of the user interface provided by the interface 613 of the information-processing devices 10, or the user interface provided by the administration server 30 (configuration-designating information receiver). When the configuration information is inputted from the user interface of the information-processing devices 10, the inputted configuration information is transmitted to the administration server 30.

The administration server 30 generates a tuning instruction message based on the inputted configuration information. When the configuration information inputted by an operator or the like consists, for example, of a host name or IP address, the administration server 30 generates a tuning instruction message whose content directs that performance adjustment be performed for data input/output requests transmitted from the corresponding information-processing device 10. Also, when the inputted configuration information consists of the type or version of an operating system, for example, the administration server 30 generates a tuning instruction message with content that performance adjustment be performed for data input/output requests transmitted from information-processing devices 10 that are running the operating system 811 in accordance with the inputted type or version.

A WWNj for specifying the data input/output request targeted for performance adjustment is set in the tuning instruction message, and the administration server 30 acquires the WWNj (network address specifying unit) by searching the database 834 with the configuration information inputted by an operator or the like as a search key, and sets this WWNj in the tuning instruction message.

As described above, the storage system 1 of the present embodiment generates a tuning instruction message based on the configuration information inputted by an operator or the like. Specifically, an operator or the like can assign configuration information that is familiar to the operator or the like, for example, and can adjust the performance of the disk array device 20. Convenience for the operator or the like is enhanced in this manner.

Other Embodiments

When a database is operating as one item of application software 812 in the information-processing devices 10, the database may sometimes administer storage location information consisting of information indicating the logical unit in which the data administered by the database are stored. In this case, the administration server 30 allows an operator or the like to specify data registered in the database; for example, to ascertain the storage location of the specified data from the aforementioned storage location information and to specify a WWNj associated with that storage location from the database 834. The administration server 30 then sets the aforementioned WWNj in the message that instructs performance adjustment to be performed. In other words, in this case, an operator or the like can carry out performance adjustment for data input/output requests relating to that data simply by specifying the data administered by the database.

An embodiment of the present invention was described above, but the description of the embodiment above was merely intended to aid in understanding the present invention, and does not limit the present invention. The present invention may, of course, include equivalents to the present invention obtainable by modification or improvement, insofar as they do not depart from the essence of the present invention.

What is claimed is:

1. A storage system comprising:
    a plurality of host computers;
    a storage control device which is communicatively connected with the host computers via a first communication network, to receive a data input/output request transmitted from the host computers, and to read or write data from or to a storage device according to the data input/output request received;
    a management server, for managing the storage system, communicatively connected with the host computers and the storage control device;
    wherein each of the host computers has a processing status data transmitter for transmitting to the management server processing status data including data that indicate the status of processing related to the data input/output request being processed;
    wherein the management server has a message receiver for receiving the processing status data and transmitting to the storage control device a message that relates to performance adjustment of the storage control device for the host computers and is determined according to the processing status data received;

wherein the storage control device has an adjustment executer for receiving the message and executing processing related to performance adjustment of the host computers according to the message received;

wherein a first network address including a network address in the first communication network is provided to the host computers;

wherein the first network address is set in the message received by the storage control device;

wherein the storage control device stores the utilization rate of each logical device;

wherein the storage control device has a logical unit manager for storing an association between the first network address, a logical unit that is a logical storage area provided to the host computers, and a logical device that is a logical storage area that is set using a storage area provided by the storage device; and wherein processing for changing the allocation of the storage devices for the host computers, executed by the adjustment executer, is performed by the logical unit manager changing the stored association in relation to the first network address contained in the message.

2. The storage system according to claim 1, wherein processing for changing the allocation of the storage devices for the host computers is included in the processing related to the performance adjustment executed by the adjustment executer.

3. The storage system according to claim 1, wherein processing for giving priority to processing of a specific data input/output request transmitted from the host computers is included in the processing related to the performance adjustment executed by the adjustment executer.

4. The storage system according to claim 2, wherein the processing status data transmitter of the host computers attaches a first network address, which is a network address in the first communication network provided to the host computers, to the processing status data and transmits the obtained data to the management server;

the host computers attach the first network address to the data input/output request transmitted to the storage control device via the first communication network;

the first network address is set in the message transmitted by the storage control device; and the processing for giving priority to processing of the specific data input/output request transmitted from the host computers, executed by the adjustment executer, including processing that causes the adjustment executer to perform processing so as to give priority to processing related to the data input/output request to which the first network address included in the message is attached.

5. The storage system according to claim 4, wherein the host computers have a configuration information transmitter for attaching a first network address provided to each of the host computers in the first communication network, to configuration information data including data in which information relating to the configuration of the host computers is set, and transmitting the obtained data;

the management server has a configuration information storing unit for receiving and storing the configuration information data;

the management server has a configuration-designating information receiver for receiving input of information relating to the configuration;

the management server has a network address specifying unit for specifying the first network address provided to the host computers targeted for adjustment by the adjustment executor based on information relating to the configuration received by the configuration-designating information receiver; and the management server sets the first network address specified by the network address specifying unit in the message.

6. The storage system according to claim 5, wherein the management server is communicatively connected with the host computers via a second communication network; and the information relating to the configuration including a second network address in the second communication network provided to the host computers.

7. The storage system according to claim 5, wherein at least one item selected from information for specifying the operating system running in the host computers, information for specifying application software running in the host computers, and the names of the host computers is included in the information relating to the configuration.

8. The storage system according to claim 1, wherein the processing status data including the number of data input/output requests that are performed via the first communication network and are registered in the transmission processing waiting queue from the host computers to the storage control device.

9. The storage system according to claim 1, wherein the host computers comprise a first communication interface for communicatively connecting with the storage control device; and the processing status data including the number of data input/output requests that are registered in the transmission processing waiting queue from the host computers of the first communication interface to the storage control device.

10. The storage system according to claim 1, wherein the storage control device functions also as the management server.

11. The storage system according to claim 1, wherein the management server has a communication interface for connecting with the first communication network; and the first network address including a network address provided to the communication interface.

12. The storage system according to claim 1, wherein the storage control device comprises:

a channel controller for performing communication with the host computers;

a disk controller for reading and writing data from and to the storage device; and cache memory adapted to be accessed by the channel controller and disk controller.

13. The storage system according to claim 1, wherein the storage control device comprises:

a channel controller for performing communication with the host computers;

a disk controller for reading and writing data from and to the storage device;

cache memory adapted to be accessed by the channel controller and disk controller; and a processor for functioning as the management server.

14. A storage control device in a storage system, the storage system including:
- a plurality of host computers, and the storage control device, which is communicatively connected with the host computers via a first communication network to receive a data input/output request transmitted from the host computers and to read or write data from or to the storage device according to the data input/output request received,
- a management server, for managing the storage system, communicatively connected with the host computers and the storage control device;
- wherein each of the host computers has a processing status data transmitter for transmitting to the management server processing status data including data that indicate the status of processing related to the data input/output reguest being processed;
- wherein the management server has a message receiver for receiving the processing status data and transmitting to the storage control device a message that relates to performance adjustment of the storage control device for the host computers and is determined according to the processing status data received; and
- the storage control device comprising:
- a channel controller for performing communication with the host computers;
- a disk controller for reading and writing data from and to the storage device;
- cache memory adapted to be accessed by the channel controller and disk controller;
- a processor for receiving a message that relates to performance adjustment of the storage control device, receiving the processing status data transmitted from the host computers, and executing processing related to performance adjustment of the storage control device with respect to the host computers, determined according to the processing status data received;
- wherein the storage control device stores the utilization rate of each logical device;
- wherein the storage control device has a logical unit manager for storing an association between the first network address, a logical unit that is a logical storage area provided to the host computers, and a logical device that is a logical storage area that is set using a storage area provided by the storage device; and
- wherein processing for changing the allocation of the storage devices for the host computers, executed by the adjustment executer, is performed by the logical unit manager changing the stored association in relation to the first network address contained in the message.

15. The storage control device according to claim 14, wherein processing for changing the allocation of the storage devices for the host computers is included in the processing related to the performance adjustment executed by the adjustment executer.

16. The storage control device according to claim 14, wherein processing for giving priority to processing of a specific data input/output request transmitted from the host computers is included in the processing related to the performance adjustment executed by the adjustment executer.

17. A control method for a storage system that comprises:
- a plurality of host computers;
- a storage control device which is communicatively connected with the host computers via a first communication network, to receive a data input/output request transmitted from the information-processing devices, and to read or write data from or to a storage device according to the data input/output request received; and
- a management server, for managing the storage system, communicatively connected with the host computers and storage control device,
- wherein each of the host computers transmits processing status data, which includes data that indicate the status of processing related to the data input/output request being processed, to the management server;
- wherein the management server receives the processing status data and transmits to the storage control device a message which relates to performance adjustment of the storage control device for the first information-processing devices and is determined according to the processing status data received;
- wherein the storage control device receives the message and executes processing related to performance adjustment of the host computers according to the message received;
- wherein a first network address including a network address in the first communication network is provided to the host computers;
- wherein the first network address is set in the message received by the storage control device;
- wherein the storage control device stores the utilization rate of each logical device;
- wherein the storage control device stores an association between the first network address, a logical unit that is a logical storage area provided to the host computers, and a logical device that is a logical storage area that is set using a storage area provided by the storage device; and
- wherein processing for changing the allocation of the logical device for the host computers is performed by changing the association stored for the first network address included in the message.

18. The control method for a storage system according to claim 17, wherein
- the host computers attach a first network address, which is a network address in the first communication network provided to the host computers, to the processing status data and transmit the obtained to the management server;
- the host computers attach the first network address to the data input/output request transmitted to the storage control device via the first communication network;
- the first network address is set in the message transmitted by the storage control device; and
- the processing for giving priority to processing of the specific data input/output request transmitted from the host computers including processing that causes priority to be given to processing related to the data input/output request to which the first network address included in the message is attached.

19. A control method for a storage system, the storage system including a plurality of host computers, a storage control device communicatively connected to the host computers via a first communication network, a management server, for managing the storage system, communicatively connected with the host computers and storage control device, the control method comprising:
- receiving, by the storage control device, a data input/output request transmitted from the host computers;
- reading or writing, by the storage control device, data from or to a storage device according to the data input/output request received;

transmitting, by a status data transmitter, processing status data, which consists of data that indicates the status of processing related to the data input/output request being processed, to the management server;

receiving, by a message receiver, the processing status data and transmitting to the storage control device a message which relates to performance adjustment of the storage control device for the host computers according to the processing status data received;

receiving, by an adjustment executer of the storage control device, the message and executing, by the adjustment executer, processing related to the performance adjustment of the host computers according to the message received;

providing to the host computers a first network address including a network address in the first communication network;

setting, in the message received by the storage control device, the first network address;

storing, by the storage control device, the utilization rate of each logical device;

wherein the storage control device has a logical unit manager for storing an association between the first network address, a logical unit that is a logical storage area provided to the host computers, and a logical device that is a logical storage area that is set using a storage area provided by the storage device; and wherein processing for changing the allocation of the storage devices for the host computers, executed by the adjustment executer, is performed by the logical unit manager changing the stored association in relation to the first network address contained in the message.

* * * * *